Figure 5:
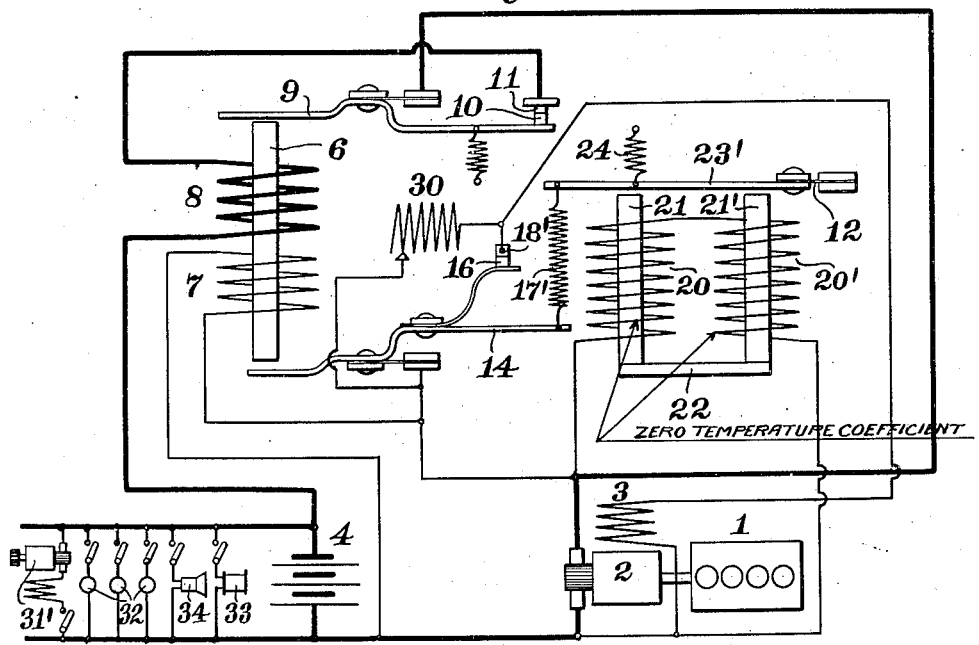

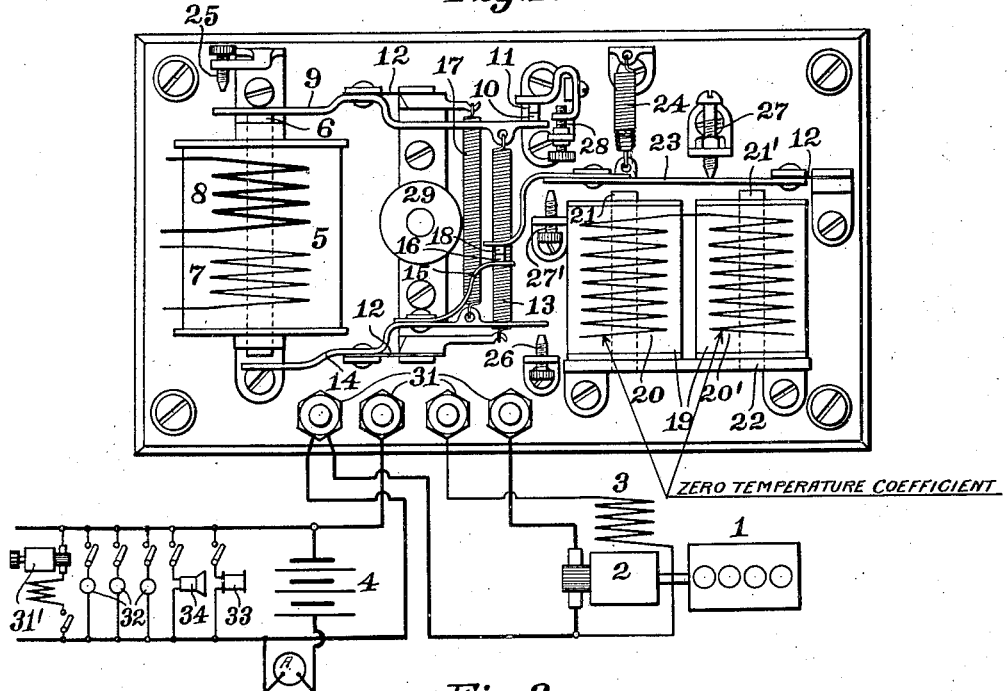
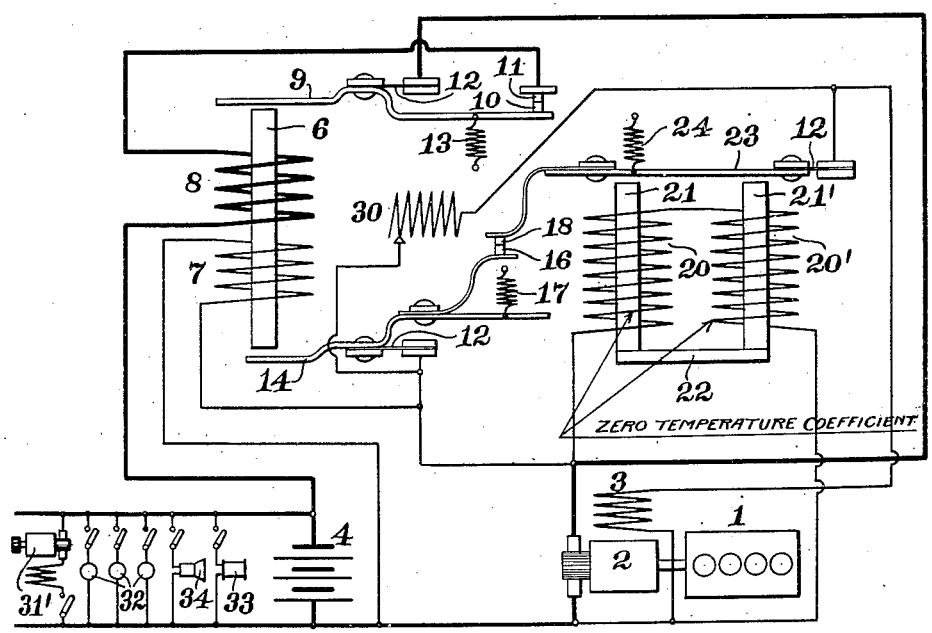

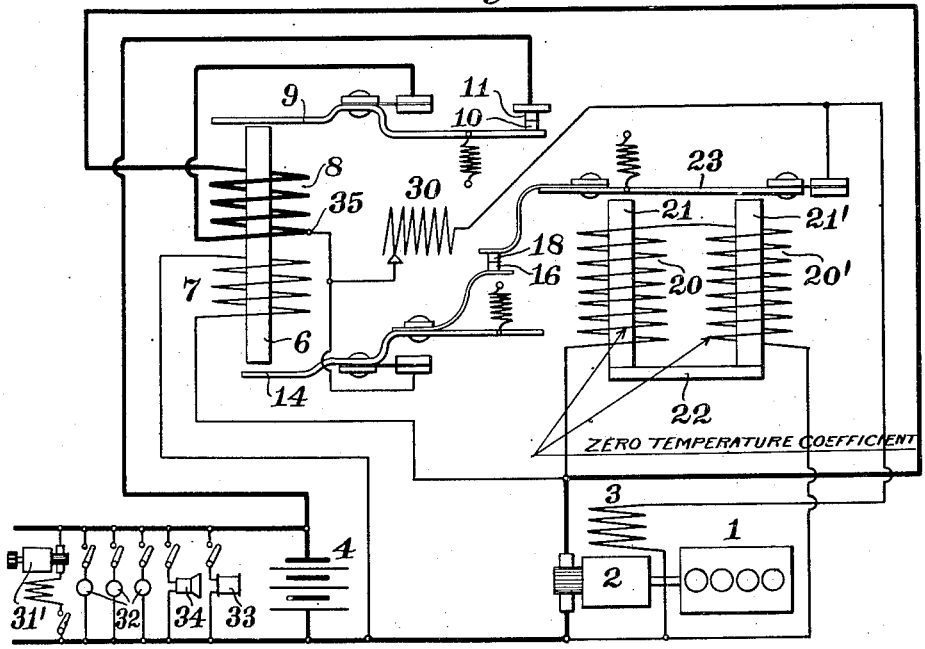
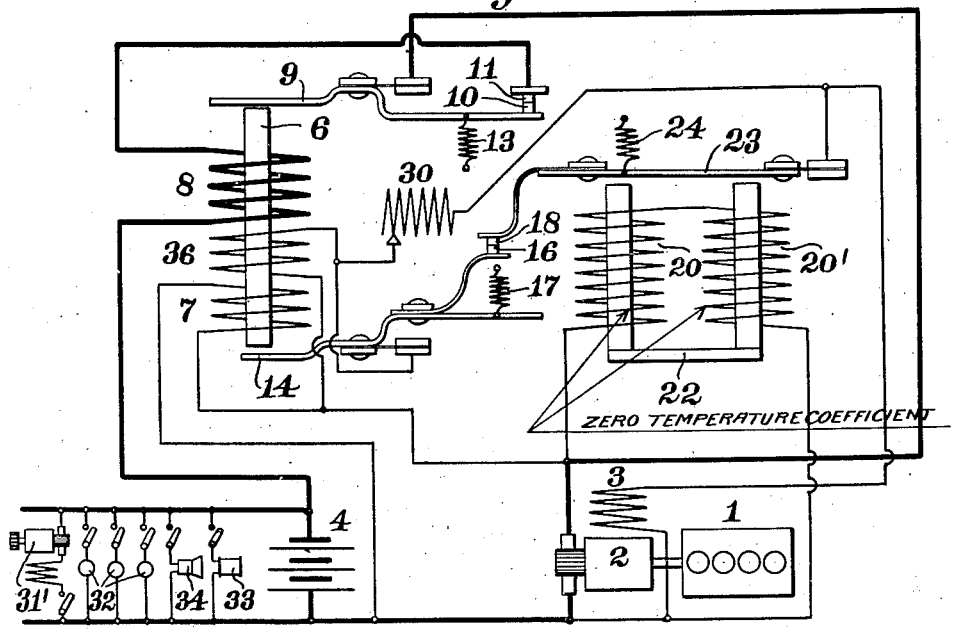

H. W. LEONARD, DEC'D.
C. G. LEONARD, ADMINISTRATRIX.
METHOD AND MEANS FOR CONTROLLING ELECTRIC ENERGY.
APPLICATION FILED JULY 22, 1914.

1,298,974.

Patented Apr. 1, 1919.
3 SHEETS—SHEET 3.

UNITED STATES PATENT OFFICE.

HARRY WARD LEONARD, OF BRONXVILLE, NEW YORK; CAROLYN G. LEONARD, ADMINISTRATRIX OF SAID HARRY WARD LEONARD, DECEASED, ASSIGNOR TO H. WARD LEONARD INCORPORATED, A CORPORATION OF NEW YORK.

METHOD AND MEANS FOR CONTROLLING ELECTRIC ENERGY.

1,298,974.     Specification of Letters Patent.     Patented Apr. 1, 1919.

Application filed July 22, 1914. Serial No. 852,340.

*To all whom it may concern:*

Be it known that I, HARRY WARD LEONARD, a citizen of the United States of America, residing at Bronxville, in the county of Westchester and State of New York, have invented certain new and useful Improvements in Methods and Means for Controlling Electric Energy, of which the following is a full, clear, and exact specification.

My invention relates to an improved method and means for controlling electric energy, and is particularly applicable to the control of electric systems employed on motor cars for lighting, ignition, starting and other purposes; although my invention is also capable of various other applications.

The usual electric system in use on motor cars consists of a dynamo, storage battery, incandescent lights, a starting motor for starting the engine by energy from the battery, and various other devices such as ignition means, electric horns, etc.

In such a system it is important to properly control the current delivered by the dynamo or generator so as to keep the battery charged and in good condition at all times. This result is dependent very largely upon proper control of the charging current and upon the electromotive force and current delivered by the generator. By means of my present invention I control this current so as to always maintain it within proper limits and I cause a change of the limits to take place depending upon changes in the circuit conditions and in the battery. My invention preserves the advantages of the control by a vibratory contact controlling the dynamo field and of having the vibratory contact responsive to fluctuations in the current, which are much greater than the fluctuations in the voltage. I avoid unnecessary waste of energy and the objectionable driving off of the water of the electrolyte in the battery after the battery is fully charged. I accomplish these and other desirable results while using a minimum number of automatically controlled circuit contacts.

One of the principal features of my invention is the securing of a bi-rate control. In the present instance, when the voltage of the battery has reached a certain maximum, the electro-responsive winding responsive to said voltage, causes a movement of a magnetic element, which movement causes a sudden and pronounced change in the reluctance of the magnet which controls a vibratory switch and which latter controls the generator field, resulting in a sudden reduction of the current supplied thereby. By this method of control, the battery may be charged at a certain proper average rate and then after its full voltage is obtained, the average charging rate is suddenly reduced to a very much smaller amount, which serves to protect the battery and maintain it in proper condition and avoids unnecessary waste of energy, and also the objectionable rapid decomposition of the water of the electrolyte in the battery.

In controlling means where the field of the dynamo is automatically controlled for controlling the current to the battery, it is very desirable that the vibratory switch should move rapidly and positively to its two extreme positions under the influence of a sufficient force to give reliability of operation and minimum wear. It is also desirable that when the circuit contact of the vibratory switch be closed, that it be rapidly and firmly closed with such force as to make good contact, preferably self-cleaning, so as to avoid the difficulties and depreciation which would result from a loose, insufficient, slow or oxidized contact. Similarly when the switch is opened, it should be opened suddenly and by a force which will certainly and quickly open the contacts even if they tend to stick together. These desirable conditions are fulfilled by my invention.

These and other objects and features of my invention will be understood from the following description and accompanying drawings illustrating one embodiment of my invention.

Figure 1 is a plan view showing the construction of the controlling means, certain windings being also indicated in diagram; Fig. 2 is a diagram showing the electrical circuits and connections of the system as a whole; and Figs. 3 to 6 are similar diagrams showing modifications.

A gasolene engine which serves as the driving engine of the motor car is indicated at 1 and is shown driving a direct current dynamo armature 2. The speed of the dynamo will be directly proportionate to that of the engine either by a direct connection, by gearing or other driving means. I preferably use a shunt wound dynamo, the shunt field winding being shown at 3. The armature supplies current to a storage battery 4 which is shown as having three cells giving a battery voltage of about six volts.

A controlling magnet 5 having an iron core 6 is provided with two windings, a shunt winding 7, and a series winding 8. At one end of this magnet is an armature 9 carrying a contact 10 which is adapted to make and break a circuit by engaging the stationary contact 11. The armature 9 as well as the two other armatures of the controlling means are mounted upon flexible spring supports 12 in the form of flat pieces of thin phosphor bronze, which are riveted to the armatures as shown or may be fixed thereto in any suitable manner. The opposite ends of these phosphor bronze strips are clamped in a stationary support in any desirable manner. This construction is rugged and durable and avoids the necessity of adjustment of any bearing and also avoids the variable friction of the usual pivot.

A spring 13 is attached at one end to the contact end of the armature 9 and attached at its other end to a fixed part or hook and tends to hold the contact 10 away from contact 11.

The opposite end of the magnet 5 is provided with another armature 14, which is adapted to be attracted by the core 6. This armature 14 is pivoted as shown on a thin phosphor bronze strip 12 and an extension of this armature has fixed thereto a flexible arm 15 carrying a contact 16. A spring 17 tends to draw the armature 14 away from the magnet 5 and to maintain contact between contact 16 and a coöperating contact 18.

Another magnet 19 is shown as having a pair of shunt coils 20, 20', connected in series with each other, the cores 21, 21', being connected together by an iron connecting strip 22. The cores 21, 21' have a common armature 23, which is flexibly supported by a phosphor bronze strip 12 at one end and carries a flexibly supported contact 18 at its opposite end. A spring 24 tends to hold this armature 23 away from the cores 21, 21' and to hold contact 18 in a direction away from contact 16.

The tension of springs 13, 17 and 24 is preferably adjustable in any suitable manner, a portion of the lower end of spring 24 being shown in section and broken away to indicate one form of adjustment comprising a screw plug adapted to turn within the end of the spring. To make this adjustment the spring is unhooked and the screw plug turned as desired, after which the spring is again hooked. Any suitable form of adjusting means may be used. I also provide an adjustable stop 25 for limiting the outward movement of the armature 9, a similar stop 26 for limiting the movement of armature 14 toward its core, a similar stop 27 for limiting the outward movement of the armature 23, and adjustable means 28 for adjusting the position of the stationary contact 11.

As above stated, the contacts 16 and 18 are yieldably supported by flexible supports; the stationary contact 11 is also yieldably supported by a flexible support so that when the contacts are closed, there is a slight sliding movement of one contact upon the other. This action tends to burnish and clean the contacts giving good electrical connection and prevents accumulation of oxid or other current resisting material. I prefer to make the contacts of pure silver on account of its desirable qualities. The mass of the vibratory elements, particularly the vibratory element 14 is made as small as is consistent with obtaining a satisfactory magnetic pull and contact. The acceleration of the light mass under the action of the magnet or under the action of the spring is consequently very rapid and assists in giving a rapid make and a rapid break of the contacts.

In Fig. 1 is indicated a spool 29 which carries a resistance 30 adapted to be connected in series with the field winding 3 of the generator and which resistance is short-circuited by means of the vibratory element 14. A series of four connection terminals 31, are shown in Fig. 1 for connection to the leads from the battery 4, armature 2 and field winding 3 as shown in Fig. 1.

Referring more particularly to Fig. 2, which shows the connections of the above described apparatus, one lead from the armature 2 is shown directly connected to one terminal of the battery 4. The other terminal of the battery is connected to the series coil 8, from which a connection extends to the stationary contact 11. When contact 10 engages contact 11, the main circuit is closed through the extending arm of the armature 9 to its support and thence to the other terminal of the armature 2. When the contacts 10 and 11 are separated, this charging circuit is open and the armature is then disconnected from the battery.

One terminal of the field winding 3 is connected to one terminal of the armature, the remaining terminal of the field winding 3 being connected through the resistance 30 to the remaining terminal of the armature. When the vibratory contact 16 is in engagement with the contact 18, the field resistance 30 is short-circuited, the current passing from one terminal of the field winding 3 through the support for the armature 23, then through this armature and contacts 18 and 16 through an extension of armature 14 and from the support for this armature to one terminal of the dynamo armature. When the contact 16 is separated from the contact 18, the resistance 30 is in series with the field winding 3.

The shunt coil 7 is connected directly across the terminals of the dynamo armature. The shunt coils 20, 20′ are connected in series with each other directly across the terminals of the dynamo armature. From the battery terminals extend leads which are shown as supplying a starting series motor 31′ for starting the gas engine 1, incandescent lamps 32, ignition means 33, and electric horn 34, or any other suitable translating devices.

The armature 9 and its contact serves as an automatic cut out switch which automatically connects the dynamo armature to the battery when the dynamo voltage is properly high; this is accomplished by the shunt winding 7 connected across the dynamo terminals and which when the voltage generated by the dynamo attains a predetermined amount, causes the armature 9 to be attracted and so closes the charging circuit. A reduction of armature voltage below a certain proper amount will permit the spring 13 to separate the contacts 10 and 11 and thus disconnect the dynamo from the battery.

When the charging circuit is closed, the series current coil 8 then exerts a force tending to attract the armature 14, which is additive to that exerted by the shunt coil 7. Assuming that the armature 23 is held by the spring 24 away from the cores of the shunt coils, 20, 20′, then when the charging current passing through the series coil 8 attains a certain maximum, the armature 14 will be attracted and separate the contacts 16, 18, which results in connecting the high resistance 30 in series with the field winding 3 of the dynamo. This resistance is proportioned to then cause a reduction in the voltage and current delivered by the dynamo armature to such an amount that the attractive force exerted upon the armature 14 is insufficient to hold the armature against the force of the spring 17, which results in the closing of the contacts 16 and 18. This short-circuits the resistance 30 which causes such increase in the current through the field winding 3 as to cause the voltage and current delivered by the dynamo to rapidly rise.

It will be noted that the series winding 8 responds to the total current delivered by the dynamo to the battery and to any of the translating devices which may be in use. This controlling series winding results in so controlling the field of the dynamo as above described, as to cause a fluctuating current to flow from the dynamo which fluctuating current integrates to a substantially steady current.

When the vibratory contact 16 engages contact 18 and short-circuits the high resistance as above explained, the voltage of the dynamo rapidly builds up, but although this rise of voltage is extremely rapid, it is a smooth, gradual rise of voltage and not such an abrupt or instantaneous one as occurs by cutting out a resistance in series with a device across a constant voltage circuit and in the absence of inductive effect. This rapid smooth rise in voltage at the dynamo brushes causes a rapid but smooth increase in the current through the work circuit and through the series coil 8. This current will continue to increase until the magnetic pull upon the armature or keeper 14 forcibly and quickly separates the contact 16 from the contact 18. The resulting introduction of the resistance in the field circuit instantly prevents the dynamo voltage from increasing any further and it begins to rapidly fall as well as the current in the work circuit passing through the series coil 8, although this rapid fall of current is a gradual, smooth reduction of current. If not arrested, a current due to the voltage of the battery would flow backward in the circuit from the battery to the dynamo armature. This would cause the series current in coil 8 to oppose the effect of the shunt coil 7 and thereby cause the instantaneous opening of the main circuit by the armature 9. But before such a condition is reached, the current through the series coil 8 in its fall from its maximum value reaches such a reduced value that the spring 17 overpowers the magnetic force exerted upon the armature 14 and closes the circuit between the contact 16 and 18. This checks the fall of voltage of the dynamo and the fall of current in the work circuit and again causes the voltage of the dynamo and current delivered thereby to rapidly and smoothly build up until the magnetic force again quickly separates the contact 16 from contact 18 and again inserts high resistance 30 in the shunt field circuit, this action being constantly repeated. When the resistance 30 is short-circuited or cut out, the current in the series coil 8 will continue to rise rapidly and almost indefinitely until the contact 16 has separated from contact 18. This is due to the proportion of the field and resistance 30 and also due to the fact that the ohmic resistance in the circuit including the dynamo armature and the battery is extremely low and a comparatively small increase in voltage of the dynamo therefore makes a large change in current through the battery and series coil 8. But even a large change in the current through the battery does not materially affect the voltage across the battery terminals and therefore upon the lamps or other translating devices, because the internal resistance of the battery is so low that the increase of voltage due to the current passing through the low battery resistance is very low compared with the normal counter-volts of the battery and the counter-volts in the battery are substantially independent of the current through the battery. It is practically impossible for the contacts 16 and 18 to stick or "freeze" as it is sometimes called. If they should remain closed, the magnetic force tending to pull the contact 16 open, will rise to many times the normal force needed to overcome the spring 17, and the current to the magnetic winding 8 would continue to rise until the contacts were separated. The action in opening the contacts is comparable to the opening of an overload circuit breaker, and limits the maximum amperes to a certain amount, and therefore prevents abnormal heating and sparking, even if the counter-volts of the battery should be abnormally low, or if the resistance of the circuit should be abnormally low due to a short-circuit. Therefore, in practice fuses or equivalent overload protective devices are entirely unnecessary. The opening is so rapid and positive that the arcing at the contacts is reduced to a minimum and in practice is entirely negligible and does not cause any material depreciation of the contacts.

If the work circuit did not comprise the low resistance storage battery, or some equivalent low resistance counter electromotive force device, but merely had devices such as incandescent lamps, field windings, or other similar devices which oppose considerable ohmic resistance to the flow of current, then evidently a large percentage increase of current in the work circuit would require a large percentage increase of the dynamo voltage. This would require a large percentage increase in voltage upon the incandescent lamps which is just what should be avoided. Also in systems in which the vibratory switch is responsive entirely or mainly to the voltage, it is evident that if the contacts should stick and it became necessary to develop twice the normal force to separate them, it would require twice the voltage, because the ampere turns would be proportionate to the voltage. This would give a very excessive and objectionable current through the dynamo armature and the battery, as well as a very excessive and objectionable voltage upon the incandescent lamps. By my invention however, the equivalent increase of 100% in the ampere turns of the controlling series coil 8 would be accomplished by a very slight increase in the voltage of the dynamo and only a momentary increase in the current through the dynamo.

Considering now the action of the armature 23 as controlled by the shunt coils 20, 20', the function of this device in its relation to the vibratory element 14 is to make a pronounced change in the average charging rate, or average current delivered by the generator armature after a certain condition of the circuit has been obtained. This is accomplished in this instance by changing the reluctance of the magnetic circuit of the magnet 5 by bringing the armature 14 nearer to the core 6 when the armature 14 is in its outermost position. In the action above described the armature 23 was assumed to be held in its outer position by the spring 24. When, however, the magnetic attraction caused by the shunt coils 20, 20' attains a certain amount, the force of the spring 24 is overcome and the armature 23 is brought to a position nearer the cores 21, 21' against the adjustable stop 27'. This gives a new position to the contact 18 and thereby holds the contact 16 when in engagement with the contact 18 in a new position and brings the armature 14 so that its outer position under these conditions is less than its outer position before the armature 23 is attracted by the cores 21, 21'. Consequently, the armature 14 with the new position of the contact 18, will be attracted by a smaller maximum current in the work circuit through the coil 8 than before. The result will be that the element 14 will now vibrate, making and breaking contact between the contacts 16 and 18, but the maximum limit of the current being much less than before, the average current under this condition will be much less.

In the present instance, the controlling factor in the change of the average charging rate, or in the average current delivered by the generator, is the voltage attained by the generator and the battery, or in other words, the voltage of the work circuit. The controlling magnet 19 is proportioned and parts adjusted so that when the battery is not fully charged or when a number of consumption devices are taking considerable current, resulting in the electromotive force of the circuit being less than when the battery is at the maximum limit, the spring 24 will exert a force greater than the attractive force exerted by the voltage coils 20, 20' upon the armature 23. The armature 23 will consequently be held against the stop 27 during such conditions. When, however, the battery is nearly at the maximum limit and the translating devices are not taking any appreciable current, the voltage of the generator and of the battery circuit will be great enough to cause the armature 23 to be attracted and bring the contact 18 to a new position so as to change the maximum reluctance of the magnet 5, giving a reduced average charging rate as above explained.

I prefer to have the minimum charging rate which automatically goes into use when the battery is nearly fully charged, about one-tenth to one-fifth of the maximum charging rate. In this way, I avoid the unnecessary driving off of the water of the electrolyte to any objectionable degree. In the usual system, it is necessary to put additional water into the battery frequently and such water should be pure water or the battery will be injuriously affected. It often happens that this addition of water at the proper time is overlooked. This exposes the battery plates and tends to damage them and also reduces the battery capacity for starting and lighting purposes. It often happens that not having pure water readily available, the operator will put in impure water with consequent depreciation of the battery.

Another advantage of my invention is that the customary ampere meter A in the path of the battery current becomes a simple and reliable indicator of the condition of the battery. Suppose the maximum rate is 10 amperes, and the minimum rate is 1 ampere. As soon as the battery is in perfectly charged or nearly charged condition, the ampere meter automatically records one ampere; as long as this reading is observed, the operator knows that his battery is in perfect condition.

As soon as the use of current from the battery lowers the voltage materially, due for example to the use of the side lights and tail light when the car is standing still, the current will automatically charge at the maximum rate of say 10 amperes when the engine is started, and this will continue until the battery is sufficiently charged. Of course, if some lamps or other translating devices are in use, the current they take will be deducted from the assumed 10 amperes and the balance will charge the battery.

The dynamo can be made the smallest, cheapest and lightest for the duty by means of my invention, as its maximum duty is actually known and this maximum duty is automatically employed whenever it is needed. In other systems the maximum amperes are not accurately known or automatically limited and the dynamo must therefore be made larger and heavier in order to have a safe margin for the largest currents. Also in other systems, where a voltage control is an essential one, the current generated may be much less than the maximum desirable amount and may be cut down to say, 5 amperes when in accordance with my invention, the dynamo would be advantageously operated to deliver 10 amperes. In order to compensate for this difference, such other systems are obliged to have a higher maximum current capacity in order to compensate for the small current which is delivered part of the time.

In order to have the magnetic effect of the voltage winding 20, 20', unaffected by changes of temperature between different seasons of the year and also practically unaffected by the heat due to the current, I prefer to employ means for having the resistance of this voltage circuit substantially constant and independent of such temperature changes. For this purpose I preferably use wire in the coils 20, 20' of zero temperature co-efficient, or nearly zero co-efficient, such as German silver, although I may employ other known means of obtaining the desired result.

While I have shown a shunt coil 7 on the same core as the series coil 8, this shunt coil is in many forms of my invention, merely an auxiliary one and not an essential one. I prefer to combine the self-closing switch responsive to the voltage which closes the main circuit, with the vibratory controlling switch and winding 8. This is done mainly to save space and cost. These two windings, however, may if desired be separate and act separately upon the armatures which they respectively control.

By placing these two windings 7 and 8 on a common core however, I get a slightly tapered charging current when the high rate is in use. For example, the charging current may be 11 amperes when the battery voltage is low, and the effect of the voltage coil 7 is therefore lower than usual. As the charging proceeds, this current will slowly and gradually fall as the voltage slowly rises, and may come down gradually to say 9 amperes. Then, suddenly, when the battery reaches the proper state of charge, the voltage winding 20, 20' will attract the armature 23 and thus cause the reluctance of the magnetic circuit of the controlling magnet to be changed causing the current to drop to the low rate of the bi-rate system which may be say, 1 or 2 amperes.

It will be understood that by means of the adjustable stops, the air gaps may be adjusted so as to predetermine the maximum average amperes, the minimum average amperes and the voltage at which the rate changes from the maximum to the minimum average rate.

In some cases it is desirable to have the voltage winding 7 produce the principal part of the magnetizing effect and have the series winding 8 produce less amount. In such case, with the construction above described, the fluctuations of magnetism in the core 6 may not be sufficiently pronounced and difficulties are more likely to occur at the contact 16 and 18. Fig. 3 illustrates one arrangement where such objectionable effect is overcome. This figure is the same as Fig. 2, except that the current from the armature of the dynamo passes through the series coil 8 before reaching the contacts 10 and 11, which control the main circuit; also the field circuit connection instead of being directly across the armature, is connected at 35 in the main circuit, giving a field connection across both the armature 2 and the series coil 8. Consequently the series coil 8 carries not only the armature current, but also the shunt field current, and consequently the wide fluctuations in the field current tend to furnish desirable pronounced fluctuations of magnetism in the core 6, even if the principal magnetic effect is due to the large coil 7. This arrangement of circuits proves very useful in many cases.

In some cases I use three windings on the core 6, two of the windings being the shunt winding 7 and the series winding 8, and the third winding being connected in series in the shunt field circuit as illustrated in Fig. 4. The circuits and connections of this figure are the same as those of Fig. 2, except the coil 36 is added to the core 6, which coil is in series with the field coil 3 of the generator, whether the resistance 30 is in or out of the field circuit. When the connection of this winding 36 is such that the current passing through it is differential or opposing the effect of the charging current in the winding 8 and the current in the voltage winding 7, the advantage is obtained of causing the value of the charging current to decrease somewhat as the speed of the dynamo increases. This is because the average field current decreases as the dynamo speed increases, giving less opposition to the magnetic effect of the windings 7 and 8 so that the vibrating contact will cause the insertion of the field resistance at a lesser maximum value of the current through the series winding 8 and thereby cause a decreased value of charging current when the speed increases.

Figure 6:
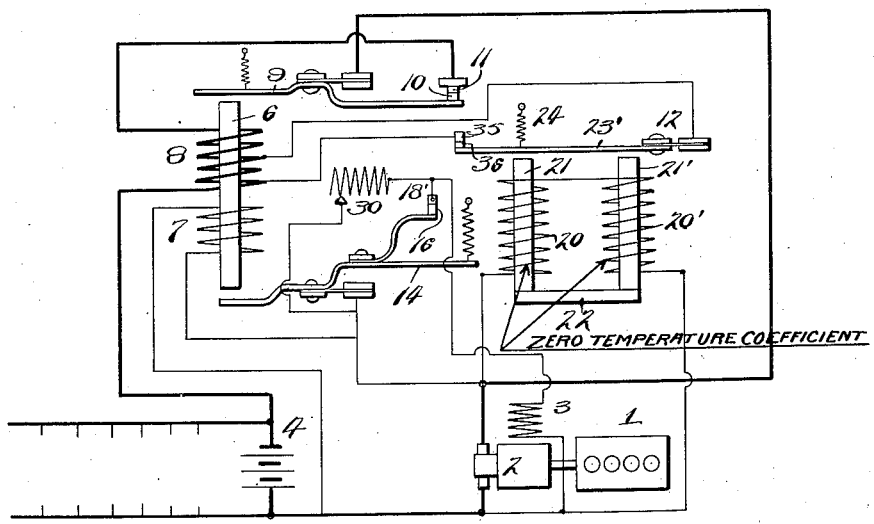

Instead of securing the bi-rate control by changing the reluctance as above described, the same effect may be obtained by changing any of the factors controlling the opening and closing of the circuit at the contacts 16 and 18. Thus, instead of changing the position of the contact 18 to cause the change of reluctance above described, the magnetic effect of the voltage windings 20, 20' may be used to change the tension of the spring 17 by means of the two different positions of the armature 23. Thus, in Fig. 5, the armature of the windings 20, 20' is designated as 23' and at its outer end is connected the spring 17' corresponding to the spring 17, the other end of the spring being connected to one of the ends of the vibratory element 14. Instead of having the contact 18 carried by and actuated by the armature 23, the contact in this case is stationary and represented in Fig. 5 by the stationary contact 18', the electrical connection from one terminal of the field winding 3 passing directly to the stationary contact 18' instead of through the armature 23. Except for these changes, the arrangement of Fig. 5 is the same as that of Fig. 2. In considering the operation of the construction indicated in Fig. 5, the armature 23' will be held away from the voltage windings 20, 20' when the voltage of the battery circuit is below a predetermined amount giving the highest tension on the spring 17' so as to cause charging of the battery at the higher rate. When the voltage is sufficient to cause the voltage windings 20, 20' to attract the armature 23' against the tension of the spring 24 and to move the armature 23' to a position nearer the voltage windings, the tension of the spring 17' in the new position is lessened so that a reduced magnetic force will attract the vibratory element 14 and consequently cause the charging current to be reduced to the lower value. It will also be understood that the armature 23 of Figs. 1 to 4, instead of being utilized to change the position of contact 18 and so changing the reluctance, and instead of being utilized to change the tension of the spring 17' as in Fig. 5, might be utilized in its two positions to change the number of effective turns in the series winding 8, as indicated in Fig. 6, increasing the number of turns in circuit of the winding 8 for the low charging rate, and decreasing them for the higher charging rate. Various other modifications may be made and the automatic control of the change in the charging rate may be secured as above stated by other than the electromagnetic means herein shown.

While I have described the application of my invention to a charging battery system, it may have other applications as to certain of its features. Thus, it may be useful in electrodeposition, electric furnace operations, electric heating, and many other fields where it is desirable to have an electric current employed at a higher rate until a certain condition results and then in response to such condition to have the current automatically reduced to a lower rate.

Having thus described my invention, what I declare as new and desire to secure by Letters Patent of the United States is:—

1. The combination of a dynamo, a magnetic winding having a movable element automatically movable to change the field strength of the dynamo when the current through said winding reaches a certain value, and a second magnetic winding automatically responsive to a condition of a circuit supplied by said dynamo for changing the reluctance of said first magnetic winding and thereby automatically changing the output of the dynamo.

2. The combination with a source of electric current, of an electric switch, a spring tending to hold said switch in closed position, a magnet for moving said switch to its open position when sufficiently energized, a circuit controlled by said switch, and a second magnet for reducing the reluctance of the first magnet when the strength of said second magnet obtains a predetermined condition.

3. The combination with a multiple arc circuit, of a magnetic device responsive to the current in said circuit, and a second magnetic device responsive to the voltage across said circuit for causing a change in the reluctance of said first magnetic device when the voltage across said circuit reaches a certain value.

4. The combination with an electric circuit, of a magnetic winding, a movable magnetic element controlled thereby, a spring tending to move said element in a direction opposite to that in which the magnetism of said magnetic winding tends to move it, a stop for limiting the movement of said element when moved by said spring, a second magnetic winding, a core therefor, an armature narrowly spaced from the poles of said core and carrying said stop, and front and back stops for said armature whereby said first mentioned stop is controlled to stand at one of two definite alternative positions.

5. The combination of an electric circuit, and two electromagnetic windings functionally related to said circuit and to each other, one of said windings responding to an electric condition of said circuit to change the reluctance of the magnetic circuit of the other of said two windings and thereby control the energy in said circuit.

6. The combination of an electric circuit, and means for controlling the current in said circuit, comprising two functionally related windings, one of said windings being adapted to change the reluctance of the magnetic circuit of the other of said windings and thereby control current through said latter winding.

7. The combination of a source of electric energy, a circuit supplied thereby, an electro-magnet having a movable armature for controlling the energy in said circuit, and a second electro-magnet having a movable armature, the movement of which causes a change in the reluctance of the magnetic circuit of said first magnet for affecting the control of the movable armature by said first electro-magnet.

8. A dynamo having a shunt field winding, a storage battery, lamps connected in parallel with said battery, said battery and lamps being supplied with current from said dynamo, a movable magnetic element carrying switch contact, a magnetic winding energized by current from said dynamo for controlling the movement of said element, a coöperating switch contact, a spring tending to hold said contacts closed, the closing and opening of said contacts controlling the field strength of said dynamo by the rapid vibration of said element in response to energy supplied by said dynamo, and a second magnetic winding supplied by energy derived from said dynamo for changing the control effected by said first magnetic winding.

9. A storage battery, a dynamo for charging said battery, and automatic means for controlling the output of the dynamo comprising a vibratory regulator, a back stop therefor adjustable to either of two positions only, and a voltage winding to control said back stop, the current in which is substantially independent of temperature changes.

10. The combination of a dynamo and automatic means for controlling the output of said dynamo comprising a vibratory regulator, a back stop therefor adjustable to either of two positions only, a series coil to govern said vibratory regulator and a shunt coil to control said back stop, the current in said shunt coil being substantially independent of changes in temperature.

11. The combination of a dynamo, a storage battery, a magnetic winding, said battery, winding and armature of the dynamo being connected in series with each other, means controlled by said magnetic winding for affecting the field strength of said dynamo and thereby controlling its output, and a second magnetic winding connected in parallel with said battery and adapted to effect the output of said dynamo, said second winding being substantially unaffected by changes in temperature.

12. The combination with an electric circuit, a magnetic device for controlling the current in said circuit and having a copper winding, a second magnetic device having a winding of low temperature co-efficient, and means for causing the second winding to effect the performance of said first winding when the voltage upon said circuit reaches a certain value.

In testimony whereof I affix my signature, in presence of two witnesses.

H. WARD LEONARD.

Witnesses:
L. K. SAGER,
B. E. SMYTH.